Patented June 5, 1934

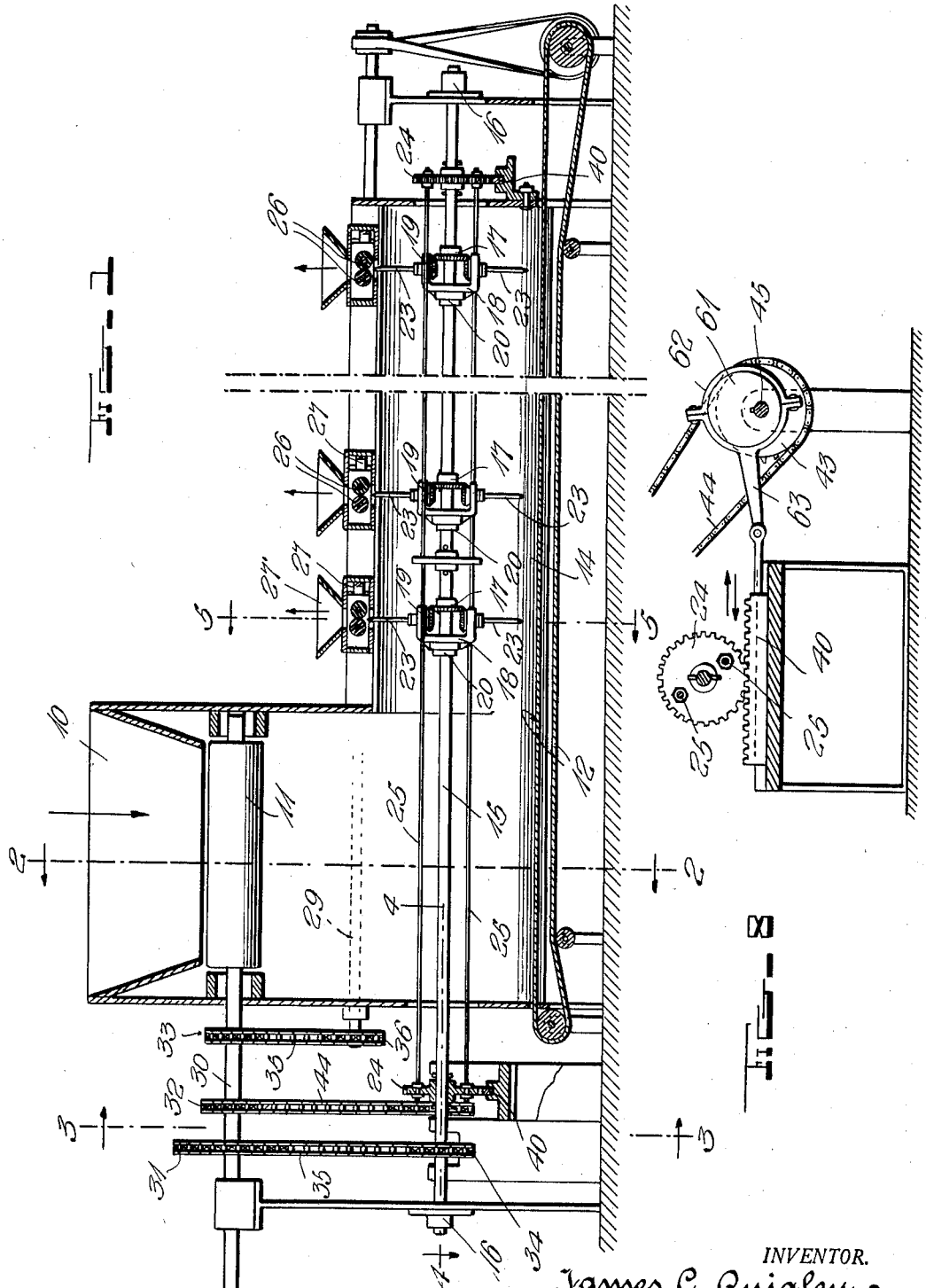

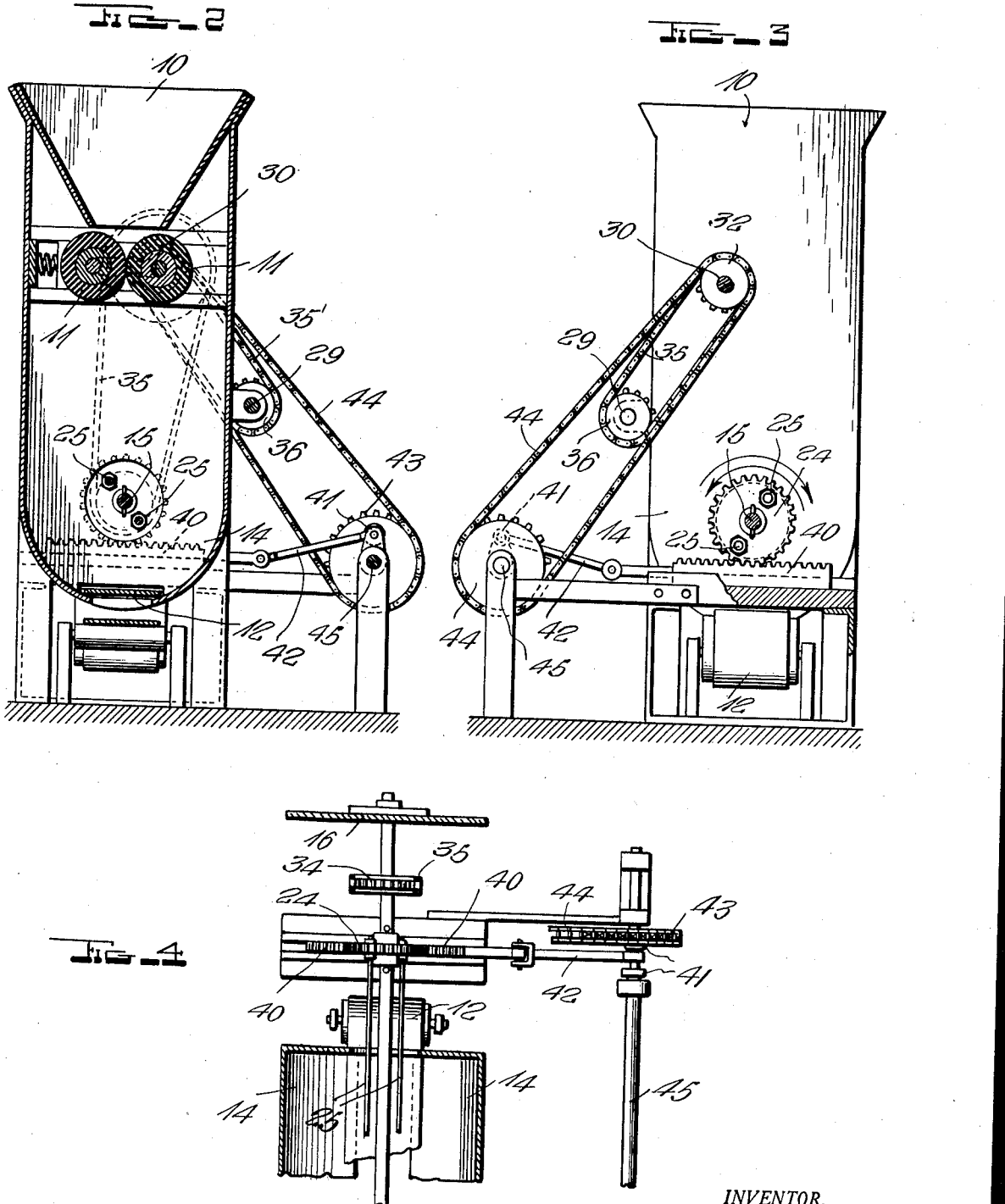

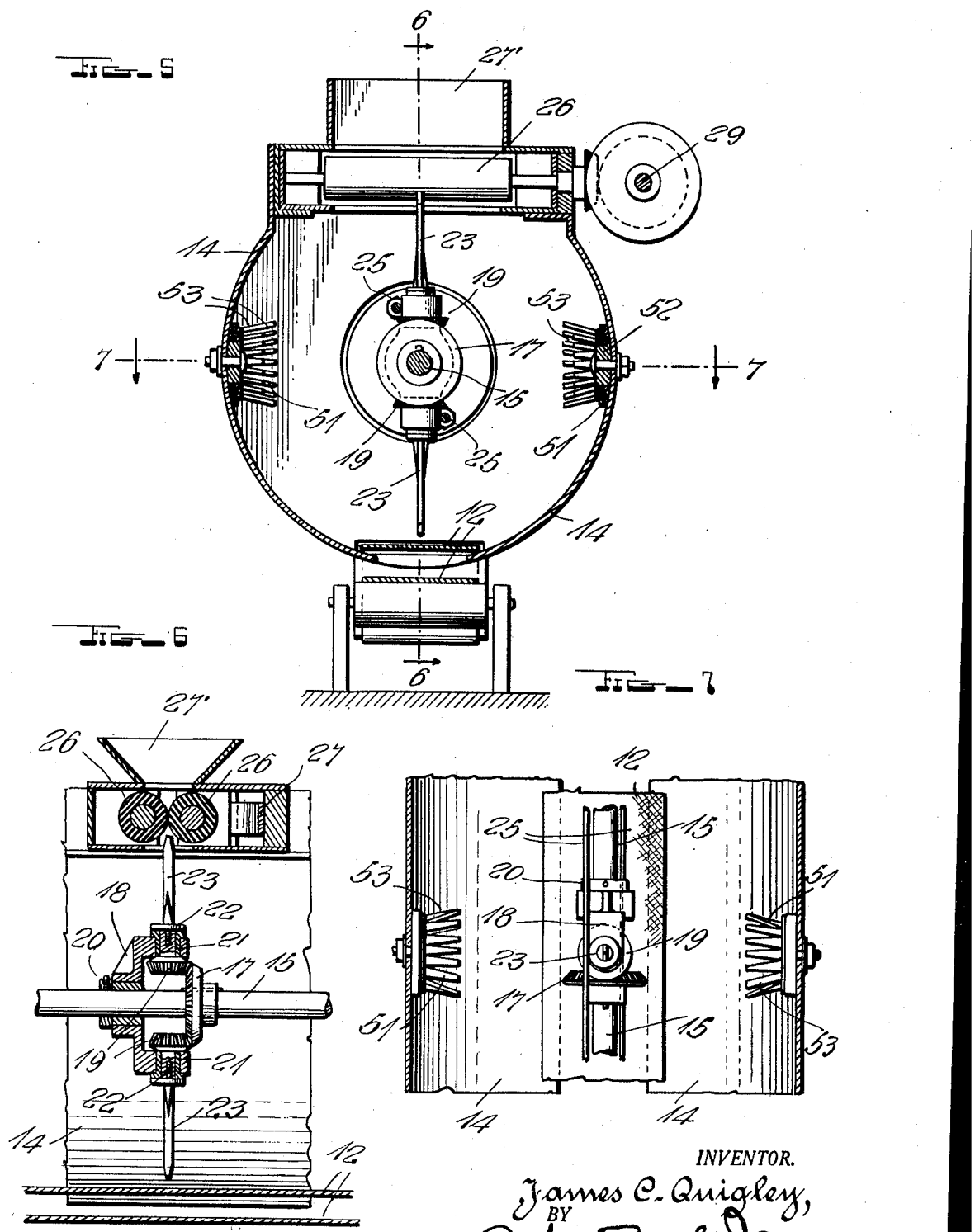

1,961,432

UNITED STATES PATENT OFFICE 1,961,432

COTTON SEPARATING MACHINE

James C. Quigley, Homer City, Pa.

Application January 22, 1932, Serial No. 588,209

3 Claims. (Cl. 19—38)

My invention relates to an apparatus for separating cotton that is gathered in the operation of sledding or stripping cotton in opened and unopened bolls from the cotton plant. In my application, Ser. No. 581,234, filed December 15, 1931, I have disclosed an apparatus for accomplishing the desired purpose. The present application embodies an improvement of my aforesaid application and particularly relates to the character of movement of the members which pick up and shake the cotton.

In the accompanying drawings which are for illustrative purposes and therefore not drawn to any particular scale, Fig. 1 is a central, vertical, longitudinal, sectional view of a cotton separating machine constructed in accordance with my invention, Figs. 2 and 3 are transverse sectional views taken on correspondingly numbered lines of Fig. 1, Fig. 4 is a horizontal sectional view taken on line 4—4 of Fig. 1, Fig. 5 is a transverse vertical, sectional view taken on line 5—5 of Fig. 1, Fig. 6 is a fragmentary vertical, sectional view taken on line 6—6 of Fig. 5, Fig. 7 is a horizontal sectional view taken on line 7—7 of Fig. 6, and Fig. 8 is a detail sectional view showing a modified form.

The opened and unopened bolls and residue removed from the cotton plant are fed into a hopper 10 and then pass between crushing rolls 11, which may be corrugated or of any other suitable type and made of rubber or suitable composition so as not to break the cotton seed in the lint. These rolls break up the burrs and crush open the unopened bolls. The mixed mass coming through the rolls falls onto a conveyor belt 12, on the inside of the bottom of the curve shaped receptacle 14.

Within the receptacle is mounted the rotary shaft 15 supported on bearings 16 at each end. Keyed to this shaft are a series of bevelled gears 17. Adjacent to each bevelled gear is an idler yoke 18 carrying two bevelled pinions 19 which mesh with the bevelled gear 17. The idler yoke 18, in which the pinions 19 are mounted to rotate, is rotatably mounted on the shaft 15, the collar 20 holding it against longitudinal movement in one direction and the keyed bevel gear in the other direction. Bearings 21 are mounted in the yoke to reduce friction between the rotary parts. Connected to the neck of the pinion 19 by a threaded joint 22 are flat pointed steel members 23. Rotatably mounted on the shaft 15 are idlers 24 connected by bars 25 that engage the yokes 18.

Above each set of yokes are mounted rolls 26 that are made of rubber or suitable composition and held in yielding engagement by the leaf spring 27. As will be noted, the end of the flat pointed members 23 is just below the bite of the rolls 26. A hopper 27' is located above the rolls 26. The rolls 26 are positively rotated by any suitable means associated with the power shaft 30. The power shaft 30 which directly rotates the crushing rolls 11 carries sprockets 31, 32 and 33 keyed directly to the same, and sprocket chains 35 and 35' transmit power to the sprocket wheels 34 and 36 respectively. The sprocket wheel 34 is keyed to the shaft 15 and rotates with it while the sprocket wheel 36 is keyed to the shaft 29 and rotates it.

In my prior aforesaid application, the flat pointed members 23 rotated about the shaft 15 continuously in one direction. In the present embodiment of my invention I have found it desirable to have these flat pointed members reciprocate in their rotary motion about the shaft 15. In order to accomplish this purpose, there is mounted to rotate on the shaft 15 the idler gears 24. These are connected together through the medium of the rods 25 which engage the yokes 18 and cause rotation of them and hence rotation of the bevelled gear and flat pointed members 23. The flat pointed members 23 accordingly rotate about the shaft 15 and at the same time about their own longitudinal axes. In order to secure the reciprocating rotary motion of the idler gears 24, there is provided a reciprocating rack 40 that engages with the teeth of the gear or pinion 24. The rack is caused to reciprocate by means of the crank 41 and connecting rod 42 interposed between the rack 40 and a driving sprocket 43. The sprocket 43 is driven through the medium of a sprocket chain 44 that engages with the sprocket 32 on the driving shaft 30. At the opposite end of the machine there is a duplicate arrangement of a rack and pinion connecting rod crank, the same being driven through the medium of a shaft 45 which rotates with the sprocket 43.

Extending inwardly from the receptacle 14 on each side of the receptacle and adjacent the pointed members 23 are rubber brushes 51 that have a body portion 52 covered with rubber and flexible rubber fingers 53 around the circumference. In operation, the cotton that is full of burrs, some of it unopened and containing sand and other foreign matter, is dumped into the hopper 10 and is crushed as it passes through the rolls 11 and falls onto the conveyor 12. As the cotton passes along under the flat pointed members 23, it is picked up by them and then rotated about the longitudinal axis of the member 23. The picked up cotton also rotates about the shaft 15 and is beaten against the rubber brush as it passes through the flexible fingers. The rubber brush has slits around its edge and removes burrs and residue by the friction of the rubber against the rotating cotton as it passes upwardly from the bottom of the receptacle. The cotton then passes up underneath the rolls 26 which draw it off of the members 23. If the cotton should remain on the members and not be taken off by the rolls 26, then it will be again beaten against the rubber fingers 53. The residue which drops back onto the conveyor may be discharged in any suitable manner.

As the rods 25 reverse the direction of their rotation, there is a period of lost motion when the rods are not in engagement with the idler yokes. When they do hit the idler yokes the impact tends to jar some more of the sand or other foreign matter that is in the cotton.

In the modification shown in Fig. 8, instead of using a crank and connecting rod for reciprocating the rack 40, I may use an eccentric cam 61 rotating within the sleeve 62 that has an arm 63 integral therewith and pivotally connected to one end of the rack 40.

I claim:

1. A machine for separating cotton comprising a conveyor for the cotton, residue and burrs, a rotary shaft, a bevelled gear keyed on the shaft, a yoke carried by and rotating relative to the shaft, means for effecting a reciprocating rotary motion of the yoke, a pinion carried by the yoke and engaging the gear and a rotary member for engaging the cotton and carried by the pinion.

2. A machine for separating cotton comprising a conveyor for the cotton, residue and burrs, a rotary shaft, a gear keyed on the shaft, a yoke carried by and rotating relative to the shaft, means for subjecting the yoke to a rotary reciprocating movement, a pinion rotatably carried by the yoke and engaging the gear, a rotary member for engaging the cotton and carried by the pinion and a member adjacent the rotary member and against which the cotton is beaten.

3. A machine for separating cotton comprising a shaft carrying a gear, a rotary cotton carrying member engaging the gear and a rotary reciprocating idler yoke on the shaft and carrying the rotary member.

JAMES C. QUIGLEY.